United States Patent [19]

Rosenberg

[11] 4,415,515
[45] Nov. 15, 1983

[54] METHOD AND APPARATUS FOR SCORING PLASTIC SHEET MATERIAL

[76] Inventor: Benjamin Rosenberg, 2044 E. 13th St., Brooklyn, N.Y. 11229

[21] Appl. No.: 366,058

[22] Filed: Apr. 6, 1982

[51] Int. Cl.³ .............................................. B29C 19/02
[52] U.S. Cl. ...................................... 264/68; 264/71; 425/456
[58] Field of Search .................... 264/25, 69, 71, 68; 425/456, 385

[56] References Cited

U.S. PATENT DOCUMENTS

| | | | |
|---|---|---|---|
| 3,635,609 | 1/1972 | Balamuth | 425/385 |
| 3,907,193 | 9/1973 | Heller | 229/16 |
| 4,028,033 | 6/1977 | Bryant | 264/71 |
| 4,064,206 | 12/1977 | Seufert | 264/25 |
| 4,352,711 | 10/1982 | Toth | 264/68 |

*Primary Examiner*—Donald E. Czaja
*Assistant Examiner*—Mary A. Becker
*Attorney, Agent, or Firm*—Edward F. Levy

[57] ABSTRACT

Plastic sheet material used for forming box blanks are provided with soft, bendable score lines by applying frictional heat through rapid vibration. The sheet material is clamped under high pressure between a resilient make-ready and a scoring tool, and is subjected to the vibratory action which generates frictional heat sufficient to melt the plastic material at the engaged interface, thereby forming a score line along which the sheet material may be bent to form an assembled box. A completed box blank may be formed in a single operational step, by cutting the box, impressing the score lines, and impressing embossments, if required, simultaneously in a single operational cycle of seconds duration.

19 Claims, 6 Drawing Figures

METHOD AND APPARATUS FOR SCORING PLASTIC SHEET MATERIAL

BACKGROUND OF THE INVENTION

The present invention relates to the formation of soft, flexible score lines on sheets of thermoplastic material, and in particular to a method and apparatus for simultaneously scoring and cutting blanks of plastic material for the production of boxes.

In providing plastic box blanks, a sheet of rigid or semi-rigid plastic material is cut to appropriate size and score lines are impressed therein so that the blank may be subsequently bent along these score lines into the form of the completed box. In forming the score lines on the blank, it is desirable that the score be a "soft" one, so that the plastic blank bends easily at each score line and when bent does not tend to return to its flat condition. It is also essential that the score lines be precisely and accurately positioned, and that their depths remain constant through lengthy manufacturing runs. The indentation of the score line must be of sufficient depth to enable the sheet material to be easily bent without cracking or crazing adjacent the score line, but must not be so deep that the material will split upon bending.

In the field of box making, methods have hitherto been devised for forming score lines in plastic box blanks, particularly blanks of transparent sheet material such as polyvinyl chloride. Initially, this was accomplished by the use of heated scoring blades applied to the surface of the plastic sheet. While these hot scoring blades produced score lines, they melted the plastic material and it was difficult, if not impossible to control their temperature, so that the depth of the score lines could not be maintained constant, the plastic tended to craze and crack adjacent the score, and the finished blank, when bent, would tend to return to its flat condition.

In U.S. Pat. No. 3,907,193, score lines are produced in plastic box blanks by applying heated scoring blades to the sheet material which rests upon a platen. Both the scoring blades and platen are electrically heated, with the result that, when the material is compressed between the platen and the scoring blades, stress relief indentations, constituting the score, are formed on the opposite faces of the sheet material. As with all externally-heated scoring blades, as described above, precise consistent depth of the score cannot be obtained. The score depths will also vary according to the type of material used and the thickness of the material.

In U.S. Pat. No. 4,064,206, a soft score is produced by pressing onto the plastic sheet material an edge forming tool which must be maintained at a temperature above the softening temperature of the plastic and below the melting temperature thereof. A high frequency electric field is applied through the plastic material causing the latter to soften by a dielectric heating action and to be deformed by pressure of the edge forming tool. This process produces commercially-acceptable score lines in most applications, but since it again depends upon the application of external heat, it is subject to the inherent deficiencies of such heat application. The apparatus employed is rather complex and expensive, requiring cooling ducts and a liquid coolant to control the applied temperature. In addition, because of the nature of the high frequency electric apparatus, it is possible to apply score lines on only one face of the material, and in some instances it is impossible to cut the blank simultaneously with the application of the score lines since the high frequency electric field tends to heat the cutting knives causing unwanted softening of the plastic in the vicinity of the cut. The process is also inapplicable to certain plastic materials having thicknesses below ten mils without producing separation at the score line, and also to certain co-extruded, laminated plastics composed of materials having different softening temperatures.

It is an object of the present invention to provide a process and apparatus for producing a soft score in plastic sheet materials without requiring sophisticated heating or cooling apparatus or the use of a high frequency electric field or ultrasonics. The score is provided by action of friction caused by pressing the material against a scoring die and vibrating either the material or the scoring die under pressure to produce frictional heat sufficient to form the score line.

Another object of the invention is the provision of a method and apparatus of the character described in which precise control of the depth of the score can be readily accomplished by simple regulation of the frequency of vibration, regulation of the pressure applied, and/or regulation of the size of the vibratory stroke.

Another object of the invention is the provision of a method and apparatus of the character described in which cutting and/or embossing of the sheet material blank can be effectively performed simultaneously with the formation of the score lines, and in which score lines can be applied simultaneously to both opposite faces of the plastic sheet material.

Still another object of the invention is the provision of a method and apparatus of the character described in which a satisfactory soft score can be produced in practically all thermoplastic materials regardless of their physical properties, and is equally effective in scoring materials of thicknesses below ten mils.

A further object of the invention is to provide a method and apparatus of the character described which is capable of incorporating standard type scoring tools in conjunction with vibratory apparatus which can be readily obtained at a relatively low cost compared to existing scoring apparatus depending upon heat or application of high frequency electric fields.

SUMMARY OF THE INVENTION

In accordance with the invention herein there is provided a method for forming a container blank having cut edges and flexible score lines, which includes the steps of providing a thermoplastic sheet capable of being formed into the container blank, providing one or more scoring tools and an elastomeric make-ready member having a flat surface, bringing the members to an inoperative position in which they are spaced from each other and face each other, and inserting the thermoplastic sheet therebetween. The members are then brought together to an operative position in which the scoring tool member engages a face of the thermoplastic sheet and presses the engaged sheet portion against the flat surface of the make-ready under substantial pressure. One of the members is now vibrated while the other member is maintained stationary, resulting in a rapid reciprocating movement between the scoring tool member and the engaged portion of the thermoplastic sheet sufficient to generate frictional heat of an intensity to soften the engaged sheet portion and form a flexible score line. The thermoplastic sheet is also cut to provide the cut edges of the blank simultaneously with the formation of the score line and may also be embossed at the same time.

The method contemplates the use of apparatus to provide the frictional heating effect. The apparatus includes a vibrating member suspended by springs from a support and mounting the elastomeric make-ready member, and an opposed, underlying stationary member which can be moved toward and away from said vibrating member. One or more electromagnets vibrate the vibrating member and the portions of the thermoplastic pressed against the make-ready member thereon, while the stationary member and the scoring tool thereon is held stationary. One or more cutting tools are also mounted on the stationary member for cutting edge portions of the thermoplastic sheet when the members are brought to their operative position, without generation of heat. Optionally in a reverse arrangement one or more additional scoring tools may be mounted on the vibrating member and an additional elastomeric make-ready member may be mounted on said vibrating member, so that the additional scoring tools engage the opposite surface of the thermoplastic sheet and vibrate thereagainst while the sheet is pressed immovably against the additional make-ready member, to provide a score line on the opposite surface of the sheet simultaneously with the formation of the first score line. Complementary embossing tools may also be mounted on the stationary and vibrating members to emboss the thermoplastic sheet simultaneously with the formation of the score lines.

Additional objects and advantages of the invention will be apparent during the course of the following specification when taken in connection with the accompanying drawings, in which:

DESCRIPTION OF THE PREFERRED EMBODIMENTS

Figure 1:
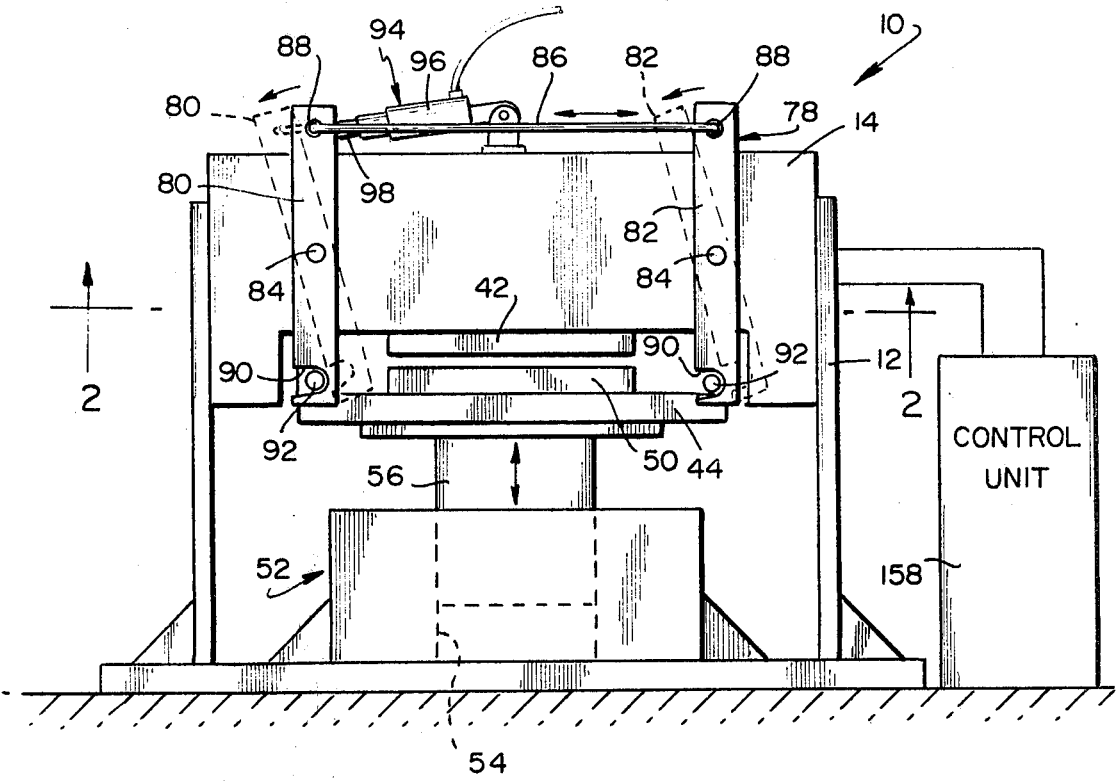
FIG. 1 is a side elevational view of a vibratory scoring apparatus made in accordance with the present invention.

Referring in detail to the drawings, there is shown in FIG. 1 a frictional scoring apparatus 10 made in accordance with the present invention. The apparatus includes a rigid support frame 12 mounted upon a floor or other support surface, and having a hollow elevated housing 14 which contains the vibratory components.

Figure 2:
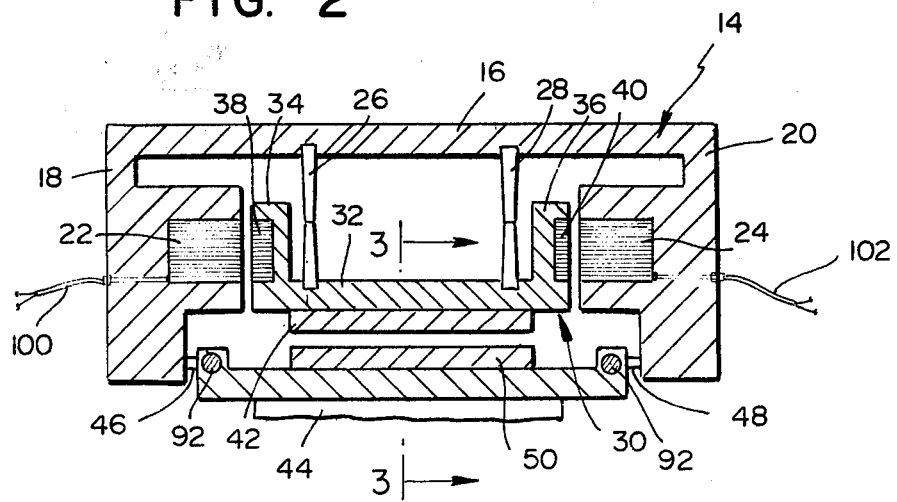
FIG. 2 is a cross-sectional view of the vibrator portion of the apparatus, as taken along line 2—2 of FIG. 1.

The interior of housing 14 is shown in FIG. 2, wherein it will be seen that the housing 14 has a top wall 16, side walls 18 and 20, and a open bottom portion. These walls form a rigid housing unit and constitute a fixed and immovable part of the support frame 12. The side walls 18 and 20 are thickened at their centers for receiving electromagnets 22 and 24 which are embedded therein.

A pair of spaced spring members 26 and 28 are secured to the housing top wall 14 and depend from the inner surface thereof. At their lower ends, the springs 26, 28 are secured to and suspend a vibrating element 30 having a flat bottom section 32 and two upstanding side sections 34 and 36. Embedded in the side sections 34, 36 are armatures 38 and 40 for the respective electromagnets 22 and 24. The vibrating element 30 is so sized and is suspended by the spring members 26, 28 in such a manner that the armatures 38 and 40 register with and are closely spaced from their respective electromagnets 22 and 24. Mounted flush against the bottom surface of the vibrating element flat bottom section 32 is a vibrating drive platen 42.

Underlying the vibrating element 30 is a stationary element or bed 44 which is mounted at its ends upon the side walls 18,20 of the housing 14 by arms 46 and 48 which are guided for limited vertical movement toward and away from the vibrating element 30. During the scoring operation, the stationary element 44 is immovable with relation to the vibrating element 30. On the upper surface of the stationary element 44 is mounted a stationary base plate 50 which underlies and registers with the vibrating drive platen 42.

The apparatus 10 also includes a hydraulic or pneumatic lifting device 52 for the stationary element 44. The device 52 comprises a cylinder 54 in which a piston 56 is vertically movable under the force of applied pneumatic or hydraulic pressure. The piston 56 underlies the stationary element 44 and operates to raise the latter toward the vibrating element 30 to an operative position, and lower the stationary element to an inoperative position in which it is spaced below the vibrating element 30 so that plastic sheet material to be treated may be introduced between the two elements and subsequently removed therefrom.

The apparatus described above is generally conventional, well known, and commercially available. It is presently used for vibration welding operations in which pieces of plastic or rubber are welded to each other by holding one piece fixed and vibrating the other piece against it under pressure, thereby generating heat that melts the material at the interface of the parts. By application of electrical current to the electromagnets, an electromagnetic force is applied alternately to the ends of the vibrating element at 120 to 240 Hz causing it to reciprocate and move the upper piece mounted thereon back and forth upon the lower piece which is stationary.

In accordance with the invention herein, this type of apparatus, previously used for welding, has been modified to perform a scoring operation upon thermoplastic sheet material, with simultaneous cutting and embossing operations. These modifications and the tools and components employed are shown in detail in FIGS. 3 and 4.

Figure 3:
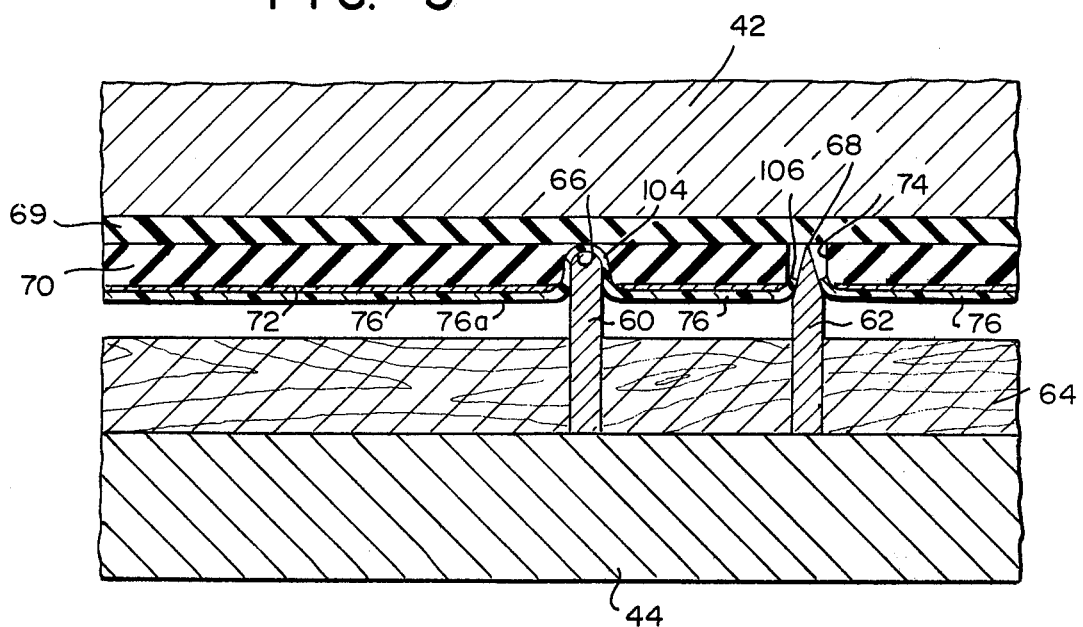
FIG. 3 is a section, on a more enlarged scale, taken along line 3—3 of FIG. 2 and showing the simultaneous action of a scoring tool and cutting tool on one face of the plastic sheet material during an operative cycle of the apparatus.

FIG. 3 shows on an enlarged scale, the score forming and cutting components utilized in the formation of plastic box blanks in accordance with the invention, there being a single scoring tool 60 and a single cutting tool 62 shown, although it is to be understood that multiple tools will be employed for formation of a complete box blank. The stationary base plate 44 has mounted thereon an upstanding tool support member 64 in the nature of a slab of hard wood in which is embedded the scoring tool 60, preferably an elongated steel rule having a rounded tip 66. Also embedded in the tool support member 64 and upstanding therefrom is the elongated cutting tool 62 which has a sharp pointed end 68. As shown in FIG. 3, the cutting tool 62 is slightly longer than the scoring tool 60.

The lower surface of the vibrating drive platen 42 is covered by a rubber sheet 69 of medium durometer which assists in transfer of the vibration. Secured to and underlying said sheet 69 is a make-ready or tympan 70 in the nature of a relatively thick sheet of elastomeric gasket material which is coated on its bottom surface by a layer of Teflon 72. The make-ready 70 and its Teflon coating present a continuous, unbroken surface above all of the scoring tools 60 mounted in the tool support member 64, but are provided with a cut-out portion 74 above each cutting tool 62. Each cut-out portion 74 is sized to permit the sharp pointed end portion 68 of the underlying cutting tool 62 to pass freely therethrough, as shown in FIG. 3.

In performing the blank forming operation, the lifting device 52 is operated to lower the stationary element 44 to its inoperative position shown in FIGS. 1 and 2, in which it is spaced well below the vibrating element 30 and the scoring tools 60 and cutting tools 62 are out of engagement with and spaced beneath the coated make-ready 70. A sheet of plastic material 76, to be formed into a scored box blank, is then inserted between the two elements so that it rests upon the upstanding scoring tools and cutting tools, and the lifting device 52 is operated to elevate the stationary element toward its operative position. During this upward travel, each cutting tool 62 engages the plastic sheet 76 and its sharp edge 68 pierces the sheet with a shearing action and enters the cut-out portion 74 of the make-ready 70. The tip of each scoring tool 60 also engages the overlying plastic sheet 76 and presses the latter firmly against the Teflon-coated make-ready 70. To insure such firm engagement, the clamping device 78, shown in FIG. 1, is employed.

The clamping device 78 includes a pair of spaced arms 80 and 82, each mounted at its center upon the front wall of housing 14 by a pivot pin 84. At their top ends, the arms 80,82 are interconnected by a rod 86 which has a pivotal coupling 88 with the respective arms. At its lower end, each arm 80, 82 is formed with a slot 90 defining a hook portion which is sized and positioned to receive and retain a lug 92 projecting from the front surface of the stationary element 44. A hydraulic or pneumatic drive assembly 94 is employed for moving the arms 80, 82 between their clamped and unclamped positions. The drive assembly 94 includes a cylinder 96 mounted on the housing top wall 16, and a piston 98 connected to the upper end portion of arm 80. In the non-clamping condition of the clamping device 78, the clamping arms 80 and 82 are disposed angularly and out of contact with the lugs 92, as shown in broken line in FIG. 1. When the drive assembly 94 is actuated, the piston 98 is drawn into cylinder 96 and moves the coupled arms 80, 82 causing them to turn about pivot pins 84 to the vertical positions shown in solid line in FIG. 1 which is the operative clamping position of the clamping device 78. In this operative position, the lugs 92 are received in the slots 90 at the lower ends of arms 80, 82. Subsequent actuation of the clamping device 78 will extend piston 98 out of the cylinder 96, thereby turning the arms 80,82 back to their non-clamping position, and the stationary element 44 is free to separate from the vibrating element 30.

Referring again to FIG. 3, when the lifting device 52 has elevated the stationary element 44 to its operative position, the clamping device 78 is operated to clamp the stationary element in this operative position with the scoring tools 60 pressing the plastic sheet 76 firmly against the Teflon-coated make-ready 70, under high pressure. In the meantime, the electromagnets 22, 24 are energized through leads 100, 102 connecting them to a source of electrical current, thereby causing the spring-suspended vibrating element 30 to vibrate at a high speed and with a very small controlled linear motion. Since the plastic sheet 76 is pressed firmly against the elastomeric make-ready 70, it adheres to the make-ready at the areas above the scoring tools 60, and therefore vibrates with the make-ready in these engaged areas. With the plastic sheet 76 vibrating against the immovable scoring tools 60 under high pressure, a frictional heat is generated, causing the plastic sheet material to soften along its lines of contact in a matter of seconds, forming the soft score. FIG. 3 illustrates the condition of the plastic sheet 76 after the sheet has been vibrated against the scoring tool 60. The sheet material has softened at its interface with the scoring tool 60, causing the tip end portion of the scoring tool to penetrate deeply within the elastomeric make-ready, causing a deep depression around which the softened plastic forms to provide an indented score line 104. The electromagnets 22,24 are not denergized, halting the vibration of the vibrating element 30 and the plastic material cools sufficiently to allow the score line to set, whereupon the elements are unclamped and separated, and the scored and cut plastic bank removed for replacement by another plastic sheet to be processed.

In the aforementioned process, an unusual and unexpected heating action results from the cooperation of the resilient make-ready 70 with the scoring tools 60. The vibrating frictional effect occurs only at those areas of the plastic sheet 76 which are engaged by the scoring tools 60 and compressed against the make-ready 70. The pressure of such engagement causes the plastic sheet to vibrate with the make-ready against the scoring tool to provide frictional heat, but in the major area of the plastic sheet 76 between the scoring tools, the sheet is not pressed against the Teflon-lined surface of the vibrating make-ready and only loosely abuts this surface, if at all, so that the plastic sheet does not vibrate under compression in these unengaged areas and no frictional heat is generated therealong. As a result, no frictional heat is generated in the vicinity of the cutting tools 62 so that the cut edges of the plastic sheet 76 are not melted to form undesirable beads, even if these edges engage the cutting tool 62, as shown at 106 in FIG. 3. This feature of localized heating of the plastic sheet also makes possible the use of scoring tools and embossing tools which operate simultaneously on the opposite face of the plastic sheet, as shown in FIG. 4, and which will be presently described.

It will be appreciated that, instead of maintaining the scoring tools 60 stationary and immovable and vibrating the make-ready 70 and the plastic sheet carried thereby, the process may be reversed with the make-ready and plastic sheet mounted on the stationary element 44 and the scoring tools mounted on the vibrating element 30, so that the scoring tools vibrate against an immovable plastic sheet. In such an arrangement, the same localized frictional heating and softening of the sheet will occur.

Figure 4:
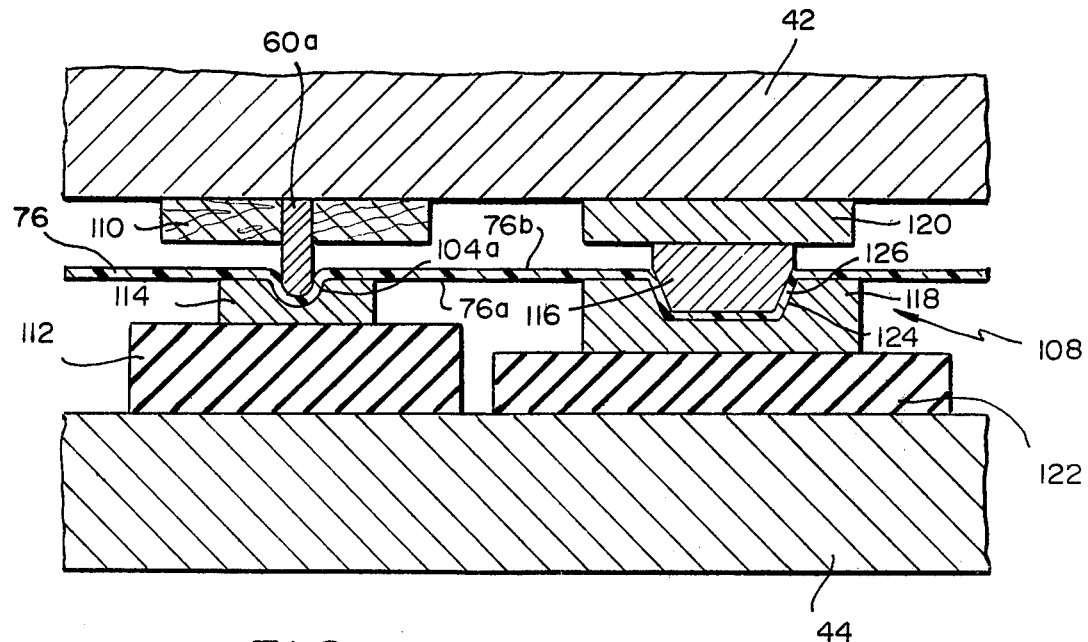
FIG. 4 is a section, similar to FIG. 3, but showing the action of a scoring tool on the opposite face of the sheet material, and the simultaneous action of an embossing die.

FIG. 4 shows the manner in which the die components of the apparatus 10 may optionally be arranged to produce scoring and embossing on opposite faces of the plastic sheet material. For this purpose, the previously-described wooden tool support member 64 mounted on the stationary element 44 is made of smaller size or is cut away at selected areas to leave exposed surface areas of the stationary element 44. The make-ready 70 and the vibrating drive platen 42 mounted on the vibrating element are correspondingly made smaller or are cut away to expose selected surface areas of the vibrating element. On these exposed areas of the vibrating drive platen 42 are mounted one or more scoring tools 60a and if desired, one or more embossing tools 108. FIG. 4 shows a scoring tool 60a embedded in and depending from a tool support member 110, made of the same high density wood as the tool support member 64, and mounted on the exposed surface of the vibrating drive platen 42. Directly therebeneath there is mounted on the exposed surface of the stationary element 44 a make-ready back up plate 112 of appropriate thickness, upon which is mounted a scoring make-ready 114 of the same construction as the make-ready 70 previously described.

The embossing tool 108 comprises a male embossing counter 116 and a female embossing die 118, incorporating a selected embossment design. The male counter 116, preferably made of a hard material, is mounted upon a back up plate 120 which is in turn mounted upon an exposed surface of the vibrating drive platen 42. The female embossing die 118 is mounted on an elastomeric make-ready 112 which is in turn mounted on an exposed area of the stationary element 44.

When the plastic sheet 76 to be processed is inserted between the separated elements 30 and 44, as previously described, and the stationary element 44 is elevated to its operative position, the tip of the depending scoring tool 60a engages the sheet and presses it firmly against the scoring make-ready 114. When the electromagnets 22, 24 are energized to vibrate the vibrating element 30, the scoring tool 60a vibrates against the engaged portion of the plastic sheet, the latter being held immovably by virtue of its compression against the make-ready 114 mounted on the stationary element 44. Such vibration of the scoring tool 60a against the fixed portion of the plastic sheet 76 produces localized frictional heating of the sheet, causing it to soften and form an indented score line 104a extending inwardly from the upper surface 76b of the sheet 76, at the same time that the scoring tool 60 of FIG. 3 is making the indented score 104 which extends inwardly from the lower surface 76a of the sheet 76. This simultaneous scoring at the opposite face of the plastic sheet 76 is made possible because the sheet does not vibrate at the area in which it is engaged by the vibrating scoring tool 60a, as previously explained.

During this operation, the male embossing counter 116 engages the underlying portion of the plastic sheet 76 and presses the latter firmly against the female embossing die 118 against the resilient resistance of the elastomeric make-ready 122 which is compressed by this pressing force. The male counter 116 is vibrated with the vibrating drive platen 42 against the underlying area of the plastic sheet 76, generating frictional heat which softens the engaged portion of the plastic material, which forms into the cavity 124 of the female embossing die 18 to form an indented embossment 126.

Embossing of plastic box blanks is usually performed as a separate operation, but which the vibrational scoring process of the instant invention, embossing may be accomplished simultaneously with the scoring and cutting, thereby reducing the time and expense which would occur if each operation were preformed separately.

Figure 5:
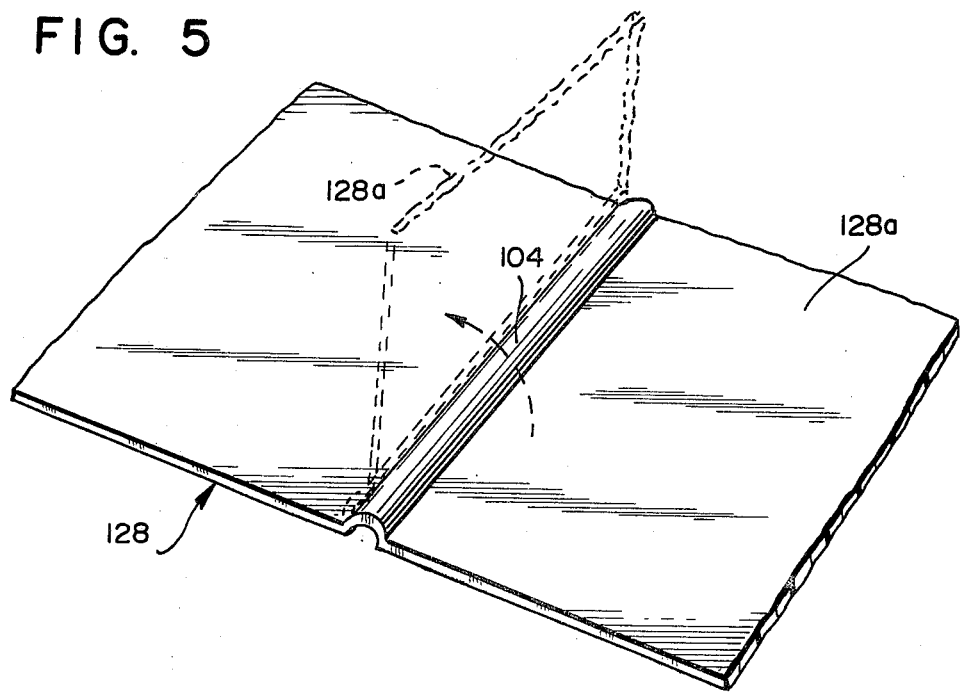
FIG. 5 is an enlarged fragmentary view of a plastic sheet formed with a score line in accordance with the present invention.

FIG. 5 shows fragmentarily a portion of the completed box blank 128 which has been provided with an indented score line 104 in the manner described above. When the blank has been removed from the scoring apparatus, the score line 104 retains its bent shape so that the blank panels on either side of the score line remain in planar alignment and the blanks may be stacked in flat condition for storage or shipment. The score line 104 is, however, a "soft" score so that when the blank is to be ultimately folded and erected into a completed box, the panels adjacent the score do not tend to spring back toward their flat position, since there is no high elastic deformity at the score lines. It will be seen in FIG. 5, that since the score line 104 has been indented inwardly through the bottom surface of the blank 128, the bent portion of the score projects from the upper surface thereof. In assembling the box, the panel 128a adjacent the score line must be bent upwardly, that is in a direction toward the bend, as shown in broken line in FIG. 5. Because of the soft score, this bending may be made at angles up to 180° without breaking the plastic sheet material.

Figure 6:
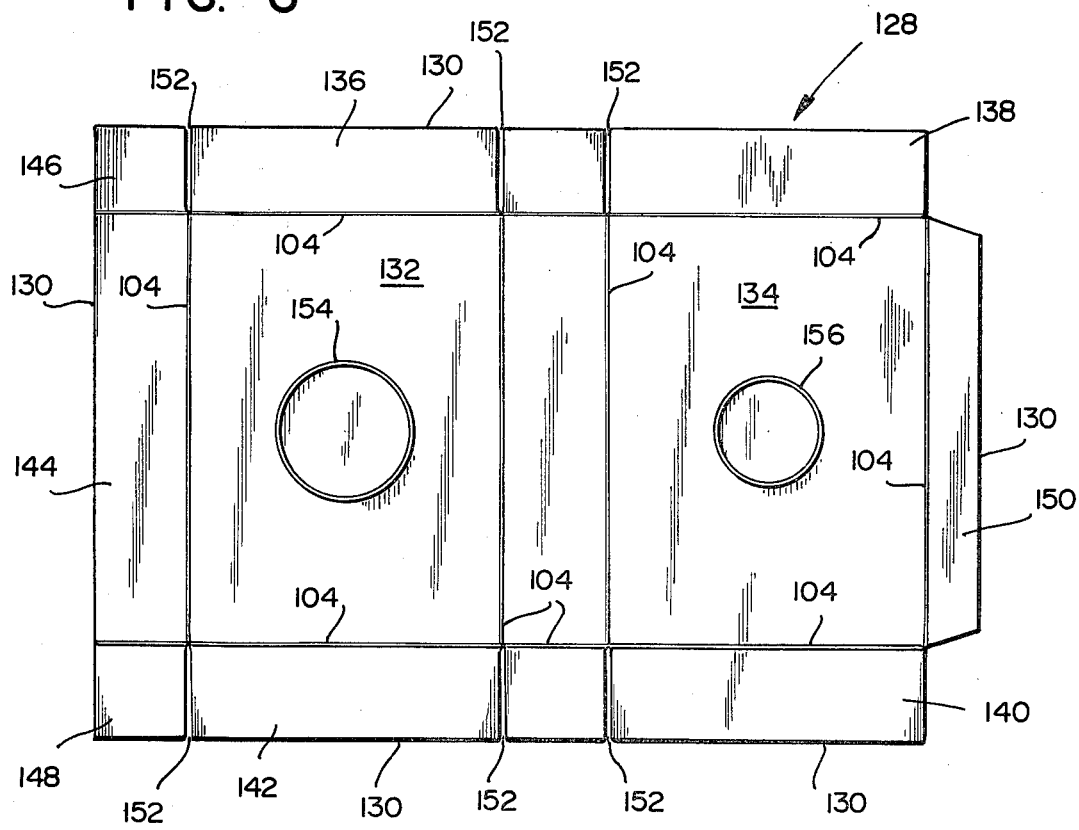
FIG. 6 is a plan view of a plastic box blank made in accordance with the present invention.

FIG. 6 shows a completed box blank 128 which is cut, scored and embossed in one operation by the process described above. The peripheral edges 130 of the blank are formed by the cutting tools 62. The score lines 104 are formed by the scoring tools 60 or 60a and define central panels 132 and 134, side panels 136, 138, 140 and 142, end panels 144, 146 and 148, and a glue lap panel 150. Cut lines 152, separating the side panels, are also formed by the cutting tools 62. Each of the central panels 132 and 134 is formed with a central embossment 154, 156 which were made by the embossing tools 108.

The energization of the electromagnets 22, 24 from a standard line source causes the vibrating element 30 to be vibrated through a controlled peak-to-peak reciprocating displacement which may be varied from 0.030 to 0.0140 inch at a frequency of 120 to 240 cycles per second. A typical vibration cycle will be of two seconds duration at 80 psi vertical and 60 psi horizontal. Vibration is triggered only after the desired pre-set compressive force is applied to the engaged portions of the thermoplastic sheet. The clamping device 78 is capable of applying a force of up to 2000 pounds upon the stationary element 44. The process is conducted at sound levels below 90 dB on the "A" scale.

An advantage of the process described herein is that almost all thermoplastics can be effectively processed using this technique. The process is particularly advantageous for crystalline resins such as acetal resins, nylon, thermoplastic polyesters, polyethylene and polypropylene, as well as PVC and cellulosics, elastomers, filled and reinforced resins and those exhibiting hygroscopic properties. The reciprocating vibratory action pushes contaminants out of the way so that even a coated surface can be given a soft score. Printed or metalized surfaces can be scored as well as those which are uncoated. Thermoplastic sheets having metalized surfaces cannot be effectively scored in conventional processes utilizing electrical fields because of the electrical conductivity of the metalized surfaces. Since the process of the invention herein utilizes frictional heating, conductivity factors are irrelevant. The process is equally applicable to co-extruded plastics constituting laminates having different heat factors, since the frictional heat generated can be continued until all plastics are properly melted.

The width and depth of the scores can be readily controlled by selective regulation of the amplitude of vibration, the frequency of vibration and the compressional force applied against the stationary element. Because of this, plastic sheet material of below ten mils thickness can be provided with satisfactory scores, and even material of 7½ can be satisfactorily processed. Prior processes employing electrically heated scoring knives or dielectric heating produced by high frequency electric fields cannot process materials of 7½ mils thickness, but rather tend to cut through the score line.

The operating cycle described above can be performed manually or may be performed automatically by use of a programmed control unit 158 shown in FIG. 1. This control unit 158 may also include the controls (not shown) for regulating the amplitude and frequency of the reciprocating movement of the vibrating element, as well as the compessive force applied by the scoring tools upon the plastic sheet materials.

While preferred embodiments of the invention have been shown and described herein, it is obvious that numerous omissions, changes and additions may be made in such embodiments without departing from the spirit and scope of the invention.

What is claimed is:

1. A method for forming a container blank having cut edges and flexible score lines, comprising the steps of:
    providing a thermoplastic sheet capable of being formed into said container blank,
    providing at least one scoring tool member and an elastomeric make-ready member having a flat surface,
    bringing said members to an inoperative position in which said members face each other and are spaced apart,
    inserting said thermoplastic sheet between said members,
    bringing said members together to an operative position in which said scoring tool member engages a face of said thermoplastic sheet and presses the engaged portion of said sheet against the flat surface of said make-ready member under substantial pressure, whereby said sheet adheres to said elastomeric make-ready member at the interface area with said scoring tool,
    vibrating one of said members while maintaining the other member stationary to provide a rapid reciprocating movement between the scoring tool member and the engaged interface portion of said thermoplastic sheet in a direction parallel to the face of said thermoplastic sheet, said reciprocating movement being sufficient to generate frictional heat of an intensity to soften said engaged sheet portion and cause the latter to penetrate deep into said elastomeric make-ready, whereby to form a flexible score line which is intended into one face of said sheet and projects from the opposite face thereof, and
    separating said members to their inoperative position and allowing said sheet to cool while maintaining it in substantially flat condition.

2. A method according to claim 1 which includes the additional steps of providing at lest one cutting tool remote from said scoring tool, and cutting the edges of said thermoplastic sheet simultaneously with the formation of said score line, when said members are brought to their operative position.

3. A method according to claim 2 which includes the additional steps of providing at least one embossing tool remote from said scoring tool and said cutting tool, and embossing a portion of said thermoplastic sheet simultaneously with the formation of said score line and with said cutting, when said members are brought to their operative position.

4. A method according to claim 1 in which said member is vibrated through a peak-to-peak reciprocating displacement of 0.030 to 0.140 inch at a frequency of 120 to 240 cycles per second.

5. A method according to claim 1 in which said scoring tool member is maintained stationary while said elastomeric make-ready member is vibrated with the thermoplastic sheet clamped thereupon, whereby the interface area of said thermoplastic sheet vibrates with a rapid reciprocating motion against the stationary tool member.

6. A method according to claim 5 which includes the additional steps of providing at least one other scoring tool member facing in a direction opposite to said first scoring tool member and positioned to engage the opposite face of said thermoplastic sheet, providing at least one other elastomeric make-ready member facing said other scoring member, bringing said other scoring member and other make-ready member together in said operative position with a portion of said thermoplastic sheet compressed therebetween, and vibrating said scoring tool member while maintaining said make-ready member stationary, to provide a flexible score line in the opposite face of said thermoplastic sheet.

7. A method according to claim 1 in which said thermoplastic sheet has a metalized surface.

8. Apparatus for forming a container blank having cut edges and flexible score lines from a flat thermoplastic sheet, comprising:
    a scoring tool member,
    an elastomeric make-ready member having a flat surface,
    means for mounting said members for relative movement between an inoperative position in which said members face each other and are spaced apart for insertion of said thermoplastic sheet therebetween, and an operative position in which said scoring tool member engages a face of said thermoplastic sheet and pressed the engaged portion of said sheet against the flat surface of said make-ready member under substantial pressure, whereby said sheet adheres to said elastomeric make-ready member at its engaged interface area with said scoring tool,
    means for vibrating one of said members while maintaining the other member stationary to provide a rapid reciprocating movement between the scoring tool member and the engaged interface portion of said thermoplastic sheet in a direction parallel to the face of said thermoplastic sheet, said reciprocating movement being sufficient to generate frictional heat of an intensity to soften said engaged interface sheet portion and cause the latter to penetrate deep into said elastomeric make-ready, whereby to form a flexible score line which is indented into one face of said sheet and projects from the opposite face thereof, and means for separating said members to their inoperative position to enable said thermoplastic sheet to cool while maintained in substantially flat condition and for removal of said sheet from between said members.

9. Apparatus according to claim 8 in which said vibrating means vibrates said make-ready member and the engaged portion of said thermoplastic sheet relative to said scoring tool member.

10. Apparatus according to claim 8 which includes a stationary element mounting said scoring tool member and a vibrating element mounting said elastomeric make-ready member, and in which said vibrating means comprises at least one electromagnet operatively associated with said vibrating element for vibrating the latter.

11. Apparatus according to claim 9 in which said vibrating element includes a horizontal body portion having a flat bottom surface emanating at each end in upright side portions, and spring means suspending said vibrating element above said stationary element, said make-ready member being mounted flush upon the flat bottom surface of said horizontal body portion.

12. Apparatus according to claim 9 in which said make-ready member comprises a thick sheet of resilient material having a Teflon coating on the surface thereof which faces said stationary element.

13. Apparatus according to claim 9 in which said stationary element has a flat upper surface supporting a tool support member mounting said scoring tool in upstanding position thereon.

14. Apparatus according to claim 13 in which said stationary element is movable toward said vibrating element to bring said members to their operative position and is movable away from said vibrating element to bring said members to their inoperative position, said apparatus also including pneumatics or hydraulic means for moving said stationary element.

15. Apparatus according to claim 14 which also includes clamping means for clamping said members in their operative position with said thermoplastic sheet compressed between said scoring tool and said platen under substantial pressure.

16. Apparatus according to claim 14 in which a cutting tool is mounted in upstanding position on said tool support member and in which said make-ready has a cut away portion overlying and registering with cutting tool for free passage of said cutting therethrough, said cutting tool being positioned to cut through said thermoplastic sheet to provide said cut edges when said members are brought to their operative position.

17. Apparatus according to claim 16 in which a second scoring tool member is mounted on said vibrating element remote from the make-ready member thereon, and in which a second elastomeric make-ready member is mounted on said stationary element remote from the scoring tool member thereon, said second scoring tool member engaging a portion of said thermoplastic sheet and pressing it against said second make-ready member when said members are brought to operative position, with said scoring tool vibrating against the engaged portion of said thermoplastic sheet and the latter being held stationary by said second matrix, whereby to form a source line on the opposite face of said thermoplastic sheet simultaneousely with the formation of said first score line.

18. Apparatus according to claim 17 in which an embossing tool element is mounted on said vibrating element and a complementary embossing tool element is mounted in registry therewith on said stationary element, said embossing tool elements coming into interengagement when said members are brought to said operative position to provide an embossment in said thermoplastic sheet simultaneously with the formation of said score lines.

19. Apparatus according to claim 18 in which an elastomeric make-ready member underlies the embossing tool element mounted on said stationary element.

* * * * *